United States Patent
Gvily

(10) Patent No.: US 7,370,015 B2
(45) Date of Patent: May 6, 2008

(54) USER IMPERSONATION BY A PROXY SERVER

(75) Inventor: Yaniv Gvily, Morgan Hill, CA (US)

(73) Assignee: SAP Portals Israel Ltd., Ra'Anana (IL)

( * ) Notice: Subject to any disclaimer, the term of this patent is extended or adjusted under 35 U.S.C. 154(b) by 1451 days.

(21) Appl. No.: 09/973,572

(22) Filed: Oct. 9, 2001

(65) Prior Publication Data

US 2002/0046170 A1  Apr. 18, 2002

Related U.S. Application Data

(60) Provisional application No. 60/240,602, filed on Oct. 12, 2000.

(51) Int. Cl.
*G06Q 40/00* (2006.01)
(52) U.S. Cl. ............................ 705/42; 705/52; 709/229; 713/200
(58) Field of Classification Search ................. 713/200; 705/52; 709/229
See application file for complete search history.

(56) References Cited

U.S. PATENT DOCUMENTS

| | | | |
|---|---|---|---|
| 5,991,810 A | 11/1999 | Shapiro et al. | |
| 6,092,196 A * | 7/2000 | Reiche | ............................ 726/6 |
| 6,182,142 B1 | 1/2001 | Win et al. | |
| 6,233,577 B1 | 5/2001 | Ramasubramani et al. | |
| 2001/0034686 A1 * | 10/2001 | Eder | ............................ 705/36 |
| 2003/0083973 A1 * | 5/2003 | Horsfall | ........................ 705/37 |

OTHER PUBLICATIONS m-Commerce Initiative Launched By InstanService.com and MobileUSA.com; Live Interaction for e-commerce Sales and Service Anywhere. Busisness Editors, Technology Writers. Business Wire. New York: Jul. 19, 2000.*

* cited by examiner

*Primary Examiner*—Frantzy Poinvil
*Assistant Examiner*—Clement Graham
(74) *Attorney, Agent, or Firm*—Buckley, Maschoff & Talwalkar LLC

(57) ABSTRACT

A user is connected to the Internet by a proxy server that impersonates the user. Websites are accessed by sending an HTTP request to the proxy server. The HTTP request is encoded with characters that are understood by the proxy as requiring that the HTTP request be intercepted and either an identified script be executed or data within the request be extracted. The impersonating proxy automatically carries out the steps that would otherwise be carried out by the user when performing a transaction at a website. In one example, a user checks a bank website for a balance inquiry. A first HTTP request includes a script identifier. The proxy retrieves and executes the identified script, which in turn causes a an HTTP response to be sent to the user's browser for personal information (e.g., user name and password). That personal information is extracted from a second HTTP request returned to the proxy, and the proxy accesses the bank website, enters the personal information, retrieves the account balance, and provides it to the user.

32 Claims, 4 Drawing Sheets

USER IMPERSONATION BY A PROXY SERVER

CROSS-REFERENCES TO RELATED APPLICATIONS

This application claims priority to Provisional Application No. 60/240,602, filed Oct. 12, 2000, which is hereby incorporated by reference for all purposes.

BACKGROUND OF THE INVENTION

Networked connections to the Internet are common, particularly in a corporate environment where multiple users are connected, via an intranet network and a proxy web server, to the Internet. The proxy server may store content (e.g., web site pages) for access by users outside the intranet. The server also provides internal network users with a portal or gateway to the Internet and runs many important internal applications. For example, the proxy server may act as a firewall to screen out harmful data and viruses. It may allocate connections, by permitting many users to share a single, high bandwidth connection to the Internet. It may also cache popular websites (saving access time) and block access to objectionable websites.

Because it serves as a user's portal to the Internet, a proxy or web server may be set-up to offer easy and convenient access to useful websites and data that are accessed via the Internet. The proxy server may be designed to provide a user interface with convenient links to selected pages of websites (e.g., the headline page of a news site). One drawback to such access is that it may be difficult to personalize (for each user) the content of those websites. Customizing and personalizing content can require use of passwords, "cookies", or other personal information, and there are practical difficulties in the proxy server storing personal information for every user. Even if such personal information can be stored, it may not be entirely useful since such information is periodically updated and there is no assurance that the stored information is the most current. Software can be loaded on a user's machine to personalize the content of a website (even if access is through a proxy server), but often the manger of a corporate network will not permit software (other than specifically authorized programs) to reside on user machines.

BRIEF SUMMARY OF THE INVENTION

According to an embodiment of the invention, there is provided a computer implemented method in a computer network for transmitting information between a user (client) web browser and a proxy server. The method includes initiating and sending a first HTTP (HyperText Transfer Protocol) message or request from the web browser. The first HTTP request has a script identifier. The proxy server receives the first HTTP request, extracts the script identifier from the first HTTP request, and searches a database for a script associated with the script identifier. The proxy server executes the script, generating a result for the user, and then transmits the result to the web browser.

The proxy server provides users with a portal to the Internet, and the result generated from the script uses result information obtained by the proxy server via the Internet. In a further embodiment of the invention, the proxy server (as a result of executing the script) sends an HTTP response to the user requesting personalized information of the user. In response thereto, the web browser sends a second HTTP request (including the personalized information) to the proxy server, wherein such personalized information is extracted, and the HTTP request is discarded (not passed on to the Internet or intranet). The personalized information is subsequently used by the proxy server to obtain results information via the Internet.

In other embodiments, the personalized information may include user names, passwords, and cookies (previously stored with the user by a website). The first and second HTTP requests are encoded with character information recognized by the proxy server, resulting in the messages being interpreted by the proxy server before the requests are discarded.

In embodiments of the present invention, the use of scripts and specially encoded HTTP requests permits the web browser to be "tricked" into providing personalized information to the proxy server that otherwise might only be provided by the user directly to the website being accessed. For example, the script can intercept the HTTP messages and thereby get user names, passwords and cookies, with the web browser "thinking" that those are being provided to the website. The proxy executes the scripts using the personalized information in order to automatically perform steps that the user would be performing itself if it were directly accessing the website to get the desired results or information.

DETAILED DESCRIPTION OF THE INVENTION

An embodiment of the invention described hereinafter provides a network for connecting a user to the Internet via a proxy, where the proxy impersonates the user and thus can obtain personalized information from or on behalf of the user.

As used herein, the term proxy may refer to any apparatus residing at the gateway between a user and a network (such as the Internet). Since all network traffic (i.e., HTTP messages from the user) flows through this point, the proxy is able to capture, interpret and extract data from the messages. Embodiments of a proxy in accordance with the present invention include, but are in no way limited to, a proxy or web server or an extension to one, a firewall or an extension to one, the local application on each machine responsible for network connections (in the case where the intranet is a single machine, this application is the bottleneck through which all communications pass), a modem or its driver, or an Internet Service Provider (ISP).

Figure 1:
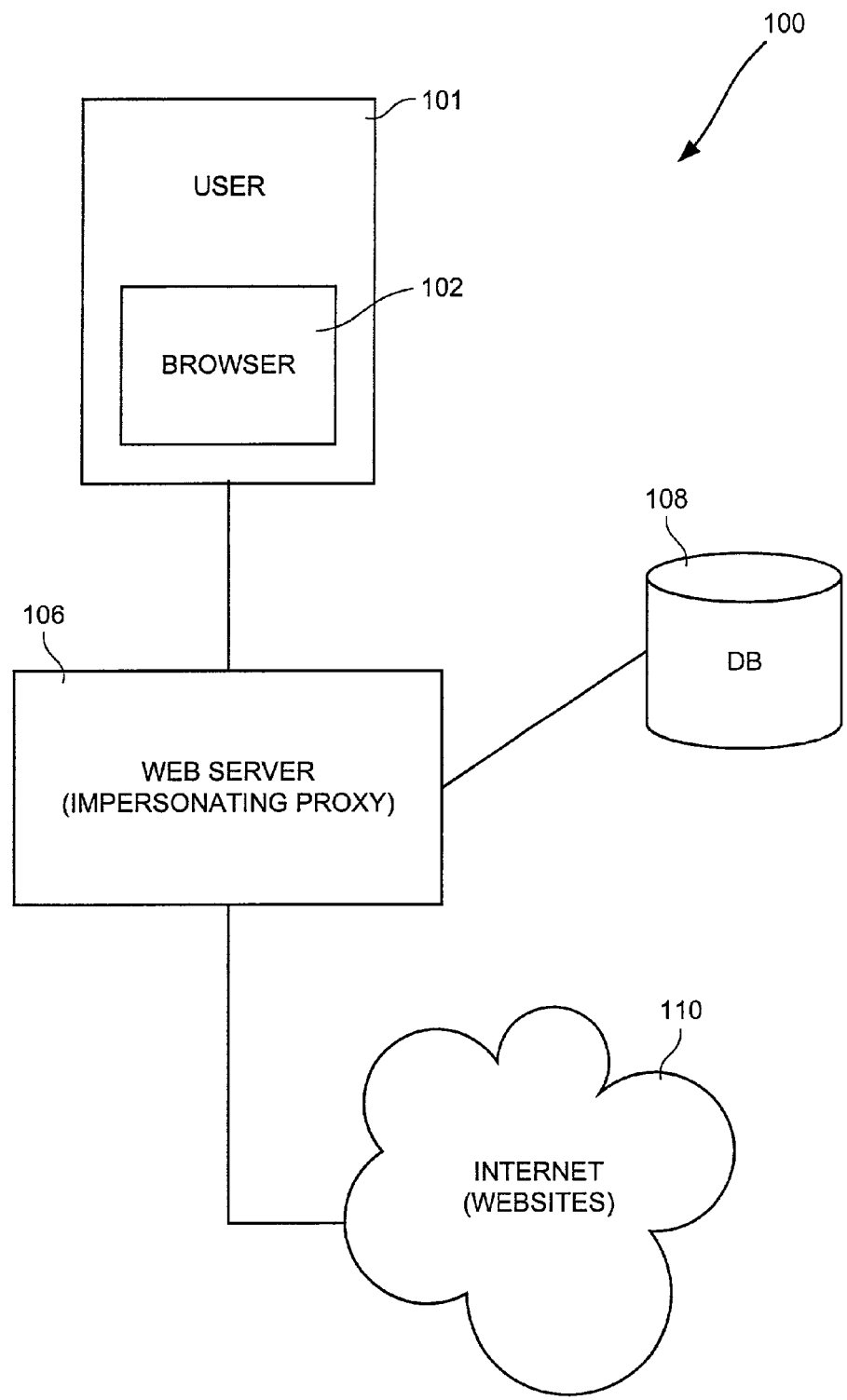
FIG. 1 is a schematic block diagram illustrating one embodiment of a network in accordance with the present invention.

There are numerous configurations for implementing the present invention. In the illustrated embodiment of FIG. 1, the invention is implemented and described using a typical corporate network 100. User machines 101 (only one of which is shown in FIG. 1) each have a conventional browser 102 for facilitating communications through a web or proxy server 106 to the Internet 110. For security reasons, this network configuration of FIG. 1 is preferred over simply allowing users 101 to connect directly to the Internet. The network 100 also has a database 108 or other data storage apparatus for storing data for use by the server 106. The server 106 runs appropriate applications in order to serve as a firewall and perform other well-known intranet management functions, such as allocating Internet connections among users, blocking objectionable websites, providing a common graphical user interface to the users at the user machines 101, etc. While not shown in FIG. 1, those skilled in the art will appreciate that various other standard hardware components may used in the network 100, such as a hub for connecting various user machines to the server 106, and a hub (and router) for connecting the server 106 (and other local web servers) to the physical, high bandwidth line going out to an ISP.

As will be described hereinafter, the corporate network provides a single point of connection (the server 106) between the corporate intranet and the Internet. Since all Internet traffic passes through this point, the bottleneck provides a preferred location to situate a user impersonating proxy embodying the present invention. Further, as will become apparent from the following description, the present embodiment of the invention can be implemented without installing additional software or other functionality on user machines. The functionality to be described will work with conventional browsers that use conventional HTTP protocol.

Before describing the operation of the network 100, an example of a circumstance where the present invention might be used will first be given.

In this example, a user wants to access personal bank records on-line at the user machine 101 and determine his/her checking account balance. If such a transaction were conducted in an environment without the server 106, the user sends an HTTP request (identifying the URL of the bank) and a response from the bank's website (seen at the user's machine in the form of a webpage from the bank) typically requires the user to go through several steps or prompts, such as log in, user ID or name, password, a selection of the account to be accessed, etc. In some cases, if the user has accessed the bank's website previously, the bank's server may have stored a cookie in the user's machine during such a previous visit. The cookie is automatically included within HTTP requests to the bank's server during subsequent visits. Among other things, the cookie may have personal information of the user indicated (e.g., account selections or transaction preferences based on past transactions) and thus may eliminate some of the steps or prompts for entry of personal information on subsequent visits.

In the network 100, when the user sends an HTTP request to the server 106 for purposes of accessing the bank's website, a script in the database 108 is executed. The script is written to automatically carry out some of the steps needed to conduct the desired transaction (determine checking account balance). Thus, the script will automatically log on to the bank's website, retrieve and provide a user name and password, and select the user's checking account for the balance inquiry. Alternatively, the script can be written to check for and retrieve a cookie from the user, even though the HTTP request is to the proxy server 106 rather than the bank's server (the web browser will typically send a cookie only to the website that created it, i.e., the bank's website). As will be described below, the proxy server 106 impersonates the user so that it appears to the bank's server that it is communicating with the user when in actuality it is communicating with the proxy server, which in turn is automatically performing steps that the user would normally be expected to complete. The present embodiment of the invention thus permits a user to avoid some or all of the multiple steps involved in accessing and then checking the balance of the user's bank account.

Figure 2:
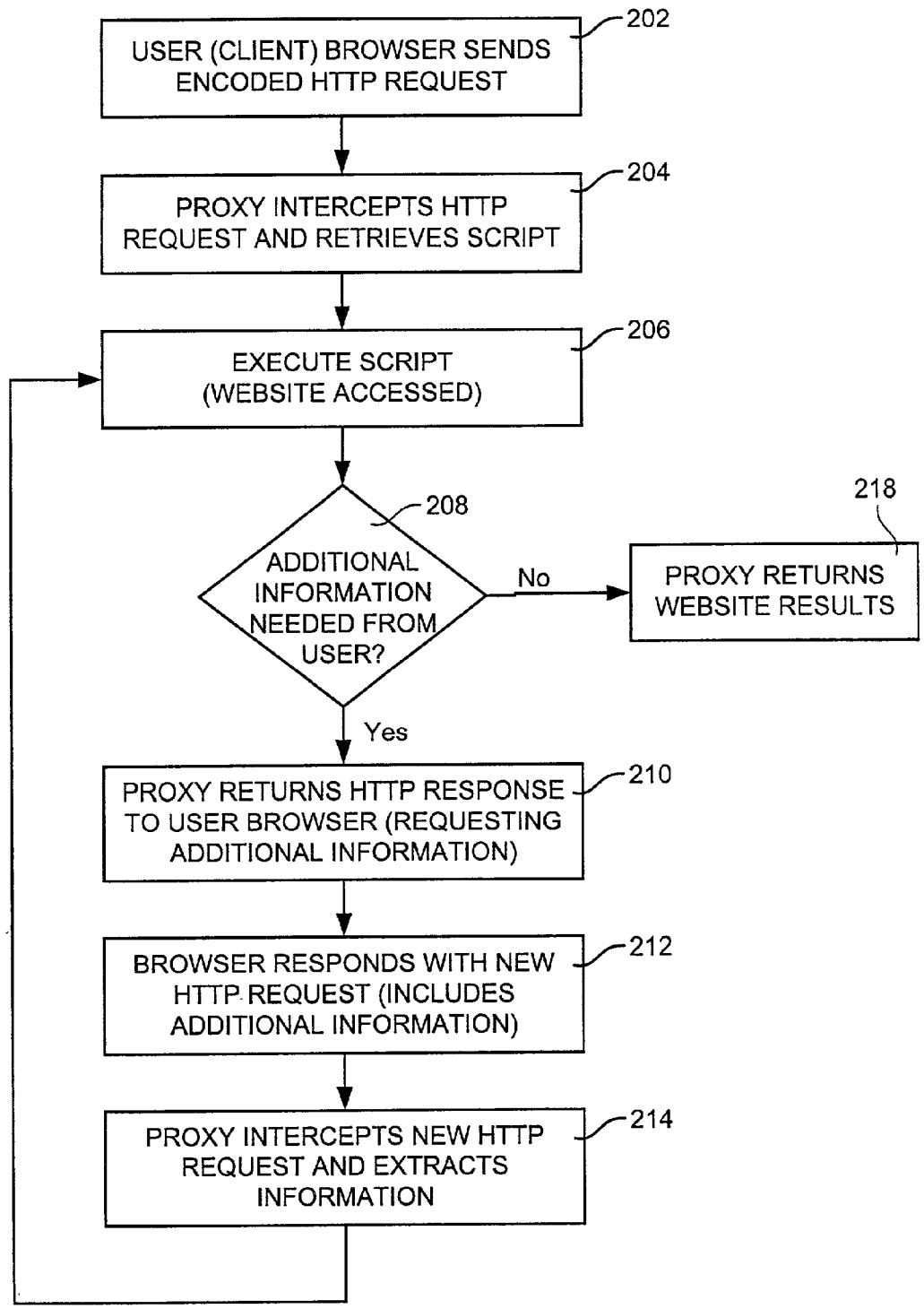
FIG. 2 is a flow diagram illustrating the operation of the network of FIG. 1.
Figure 3:
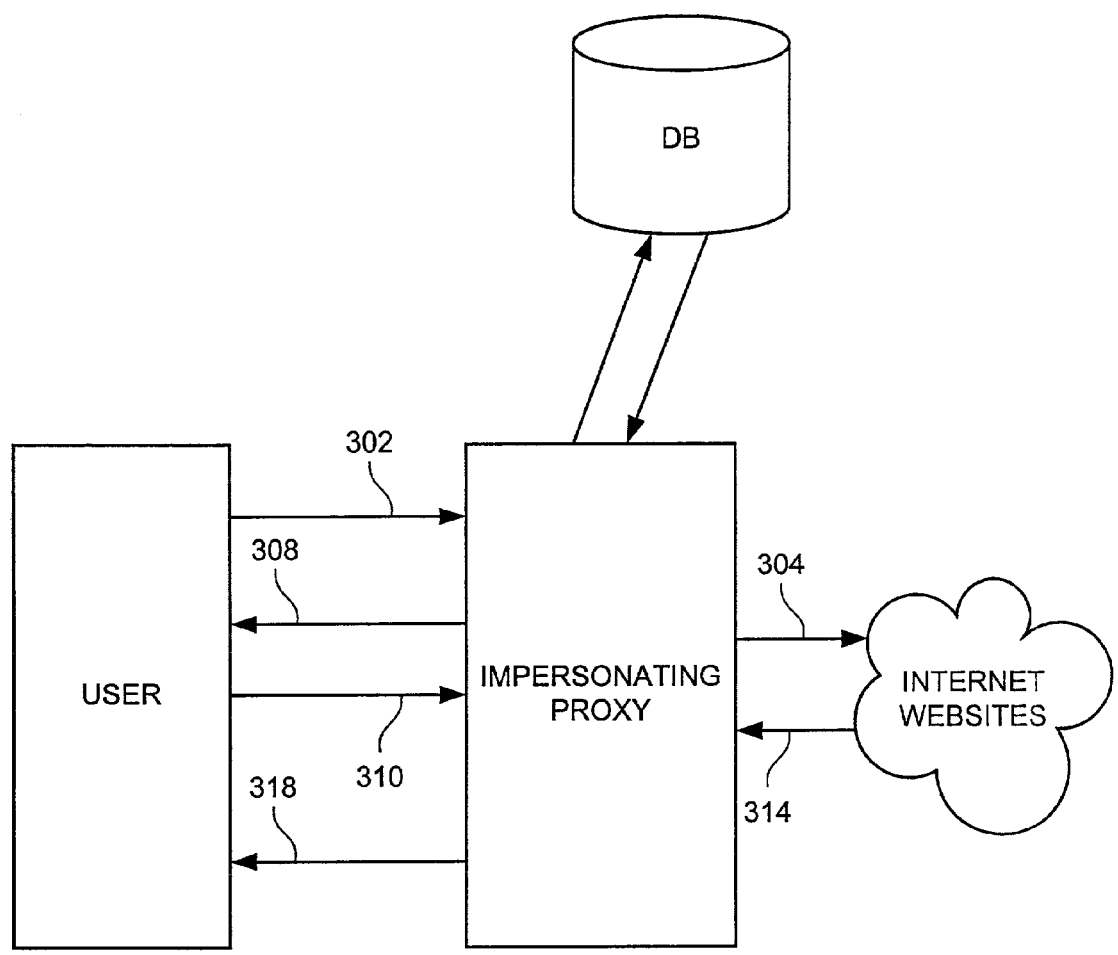
FIG. 3 is a block diagram illustrating the flow of HTTP messages and other information in the network of FIG. 1.

Turning to FIGS. 2 and 3, the operation of the proxy server 101 in impersonating the user will now be described. To understand the operation, the various steps disclosed will be described in connection with the previously referenced example of an online checking account balance inquiry.

In order to initiate a balance inquiry, the user's browser sends an encoded HTTP request to the proxy server, step 202 in FIG. 2 and arrow 302 in FIG. 3. The request can be manually entered into the address bar of the web browser, but in a more likely embodiment, the request can be sent in response to the user clicking on an icon already programmed into the user's machine and implemented as a hypertext link on the user's homepage (as managed by the server 106). An example of such an HTTP request might be:

GET http://www.myproxy.com/runScript/1234?$proxy$ HTTP/1.1.

In this HTTP request, the proxy server's URL is "myproxy". The sequence of characters or code "$proxy$" indicates to the proxy that this is a request to be handled by it and not to be forwarded to the Internet. At step 204, the proxy intercepts and interprets the request, which in this case specifies that the script "1234" in the database 108 is to be retrieved and executed (step 206) at the proxy server.

The following pseudo-code is one possible implementation of the script "1234" that, when executed at the proxy server, implements a checking account balance inquiry:

GetURL("https//www.mybank.com")
loginButton.Click( )
userName.Text=GetUsername("http://www.mybank.com")
password.Text=Get Password("https://www.mybank.com")
submitButton.Click( )
checkingAccountHyperlink.Click( )
result="Your balance is "+balanceElement.Text
logoffButton. Click( )

Figure 4:
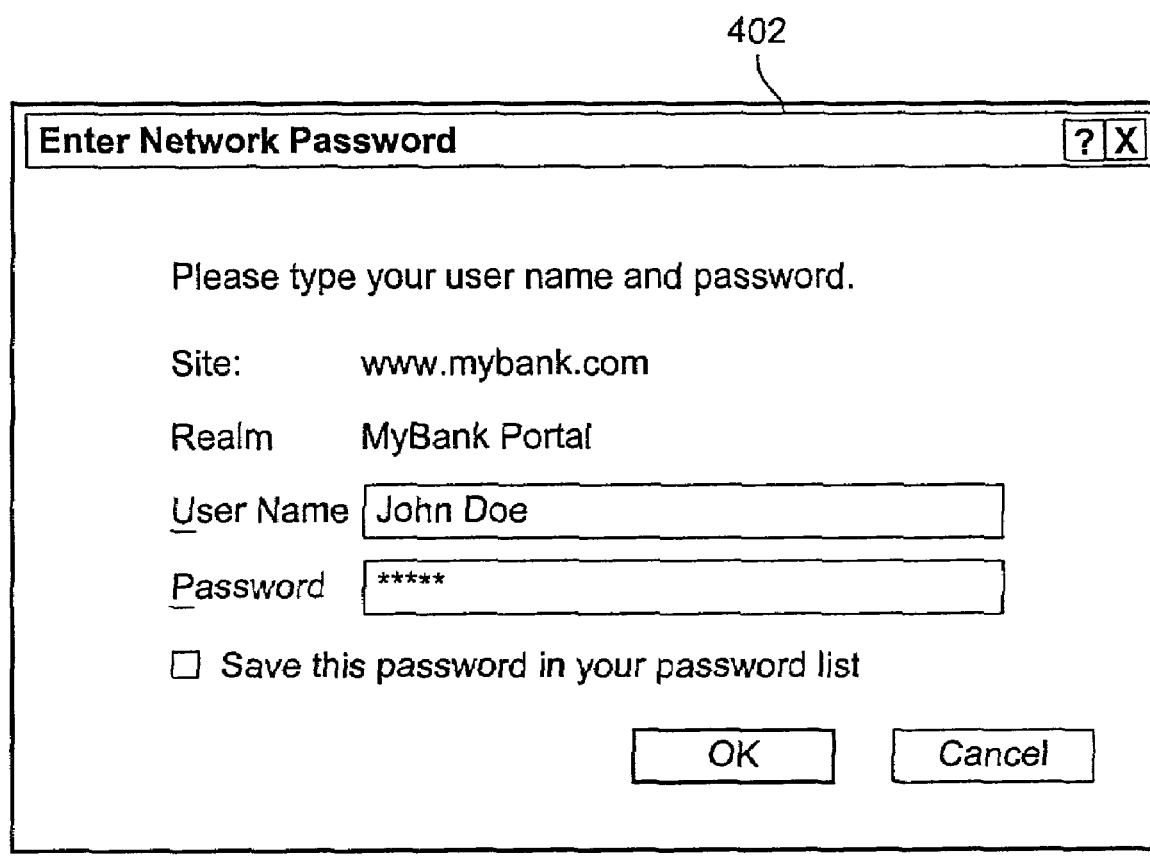
FIG. 4 illustrates the entry of a user name and password in response to an HTTP response from the proxy server.

In this script, "mybank" is the URL for the bank's website. The bank's home page is fetched from the Internet (arrow 304 in FIG. 3) and the login button on the page is automatically pressed. The proxy determines whether additional information is needed from the user (step 208), and in our example, the script automatically requests a user name and a password from the user (arrow 308). The script requests the user name from the proxy ("GetUsername" command), and since it is not yet at the proxy, the proxy sends a request for authorization HTTP response to the user, such as standard HTTP error code #401 Unauthorized, as follows:

HTTP/1.1 401 Unauthorized
WWW-Authenticate: Basic realm="www.mybank.com"

which will cause the user's browser to pop-up the dialog box 402 illustrated in FIG. 4. In FIG. 4, that dialog box serves as a prompt for the user to enter both the user name and password, and after entering and clicking OK, this information is returned to the proxy 106 (although intended by browser for bank's website) in the form of a new HTTP request (step 212, arrow 310), which HTTP request might appear as follows:

GET http://www.mybank.com/$proxy$ HTTP/1.1
Authorization: Basic QWxhZGRpbjpvcGVuIHN1c2FtZQ The proxy—seeing the encoding "$proxy$"—intercepts the new HTTP request (step 214), extracts the needed information (user name and password) and continues to execute the script with the additional information (step 206). The proxy is now able to reply to the "GetUsername" command in the script, returning the user name (e.g., "John Doe") to the script. When the script requests the password (using the "GetPassword" command), that information is already at the proxy, and the proxy need not issue another request for authorization to the user.

While not described above, it should be apparent that the new HTTP request returned by the user to the proxy is simplified (for purposes of explaining the invention). Such a request would need to include a session identifier so that the proxy will know the script for which it is to continue execution.

It should be appreciated that after the proxy receives the user name and password, it can be stored at the proxy (e.g., at database 108) for future calls to the script by the same user. The script can be executed without the proxy having to issue any authorization requests, and the steps 210, 212, and 214 in FIG. 2 can be bypassed in future calls.

After retrieving the user name and password, the proxy continues to execute the script, by retrieving the appropriate pages from the bank's website (arrow 314), entering the user name and password, clicking the submit button, and clicking a checking account hyperlink. After getting the needed balance information from the website, the script returns the result (checking account balance) to the user. In this embodiment, that information is returned (step 218, arrow 318) and is displayed at the user machine as, for example, "Your balance is $312.87". The script then logs off at the bank's website.

While not specifically described above in connection with FIGS. 2 and 3, the present invention can also be used with cookies stored at the user machine. One obstacle to the proxy server 106 using cookies is that typically a web server can only receive cookies that it itself has created and has put at the user machines, and cannot receive cookies put on those machines by other servers or websites (i.e., in the above example, the proxy server cannot receive cookies put at a user's machine by the bank's server, and vice versa). In another embodiment of the invention, the proxy server overcomes this obstacle by having a script loaded into the database 108 that "tricks" the browser at the user machine into sending-to it a cookie intended for another website (i.e., the bank's website).

As an example, assume that in accessing bank records it would be useful to have the user cookie sent along with an HTTP request to the bank's website. The HTTP request to the proxy server might be:
GET http://www.myproxy.com/runScript/1235?$proxy$ HTTP/1.1

The proxy server 106 intercepts and parses the request, by recognizing the special characters "$proxy$" as indicating that it (the proxy) is to handle the request (and not forward it on to the Internet). In this case, the HTTP request tells the proxy server to execute the script "1235". This particular script can be designed to get cookies returned to it even if it is not the creating website by returning to the user a standard HTTP redirect response (e.g., HTTP error code #307 Temporary Redirect), pointing to the website (i.e., the bank's website) whose cookie it needs. The script can be written to perform the following proxy response (a response to the initial HTTP request from the user):
HTTP/1.1 307 Temporary Redirect
Location: http://www.mybank.com/$proxy$ This response tells the user's browser that it is to redirect a request to the bank's website (at the URL "mybank") and attach to the request the special characters "$proxy$". As earlier described, the characters "$proxy" are recognized by the proxy as indicating that the returned HTTP request is to intercepted and handled by it, and not forwarded to the Internet. The user's browser therefore initiates the following new request that includes the cookie:
GET http://www.mybank.com/$proxy$ HTTP/1.1
Cookie: UserID=4433123458; Frames=No This new HTTP request is intercepted by the proxy, the cookie (4433123458) is extracted, and the request then discarded or nullified at the proxy. In addition, the script could also request the user name for the mybank.com domain, causing the proxy to send a request for authorization response (HTTP error code #401), which as described earlier in connection with FIGS. 2, 3 and 4, causes a dialog to pop-up at the browser, and after user name and password are entered, is returned to the proxy in the form of a new HTTP request. That proxy request is intercepted and the user name and password extracted, so that the proxy is able to fully impersonate the user by not only getting the user's cookie, but also the user's name and password in order to login at the bank's website.

The following is one example of Pseudo code for script 1235 that could implement the functions just described:
GetURL("https //www.mybank.com")
loginButton.Click( )
userName.Text=GetUsername("http://www.mybank.com")
password.Text=Get Password("https://www.mybank.com")
submitButton.Click( )
checkingAccountHyperlink.Click( )
result="Your balance is "+balanceElement.Text
logoffButton.Click( )

As should be apparent, this can be the same pseudo code as shown earlier in connection with extracting a user name and password at the proxy (FIGS. 2, 3 and 4). In this case, whenever there is a "GET" URL call (HTTP request), and there is a cookie for the website stored at the user's machine, the cookie is automatically attached to the request. Of course, since it is the same pseudo code as described earlier, it also retrieves a user name and password from the user for the proxy to send to the "mybank' website. As should also be apparent, when the website is accessed through the proxy, the website may send an updated cookie to the user. In such case, the script may be written in order for the proxy to pass the cookie on to the user (and perhaps also store it in the database 108). If the cookie (and other personal information) is stored in the database, the proxy server may be programmed to automatically return the personal information when a subsequent HTTP request comes from the user (eliminating most, if not all, the script steps).

It should be apparent that embodiments of the present invention will have many applications other than those described above. Generally, the proxy can be used to impersonate a user when communicating with any website needing one or more steps to be performed. Those steps can be accomplished automatically by the proxy with minimal (and perhaps no) involvement by the user (e.g., when personal information has previously been retrieved and stored by the proxy). One example of a further application would be a transaction at a retail website, where the user must go through a number of steps, such as searching for the product, clicking on the "add to cart" button, checking out, entering credit card information and a shipping address, and then confirming the order. By accessing the retail website through the proxy, the proxy is able to impersonate the user and automatically complete most if not all of these transactions steps from a single command (as far as the user is concerned)

Another possible application of the present invention might involve the proxy server impersonating the user by "anticipating" information that the user will need to provide to or need to get from another user or another server. For example, a new employee (user) on the corporate network 100 might need to provide employee information when he begins employment. When the user first logs on to the proxy server, the proxy server asks for that information even before it has been specifically requested by another server (e.g., a server maintained by the employer's personnel department). Thus, when that user sends its first HTTP message to the proxy, the proxy recognizes the user as a new employee and returns an HTTP response (setting up an HTML page on the user's machine) that asks for basic employee information (name, address, employee ID, payroll deductions, etc.) which the proxy stores in the database 108. When that information is later sought by the employer's server, it may be automatically supplied by the proxy without having to be separately entered at the user's machine.

Alternatively, the user might have important information automatically "pushed" to it when the proxy has (or has access to) that information. For example, if an important corporate message needs to go to all users on the network 100, then as each user logs on to the proxy (by opening the user's browser and attempting to navigate to a website), the proxy can be programmed to check for the last "corporate" message viewed by that user. If it is not up-to-date (i.e., the most recent, important message), the proxy first "pushes" that message to the user as an initial HTTP response rather than returning information from the user-requested website.

In conclusion, the present invention provides a novel method and system for impersonating a user at a proxy, in order to conveniently access personal information, reduce the complexity of steps involved in on-line transactions, or achieve other advantages apparent to those skilled in the art. While a detailed description of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A computer implemented method in a network for transmitting information between a web browser and a proxy server, comprising:

encoding, initiating and sending an HTTP request from the web browser to a proxy server, the HTTP request having a script identifier, wherein the proxy server is disposed between the web browser and a resource associated with the HTTP request;

decoding the request and extracting, at the proxy server, the script identifier from the HTTP request, and thereafter searching a database for the script associated with the script identifier;

executing, at the proxy server, the script associated with the script identifier at the proxy server;

generating, at the proxy server, a result from the script associated with the script identifier;

discarding the request without forwarding the request to the Internet; and transmitting the result from the proxy server to the web browser.

2. The method of claim 1, wherein the proxy server is a gateway to the Internet for a user of the web browser, and wherein the result generated from the script uses result information obtained by the proxy server via the Internet.

3. The method of claim 2, wherein the HTTP request from the web browser to the proxy server is a first HTTP request, wherein executing the script at the proxy server results in an HTTP response being sent from the proxy server to the web browser, such HTTP response requesting personalized information for the user, and wherein the web browser responds with a second HTTP request having such personalized information.

4. The method of claim 3, wherein the first and second HTTP requests to the proxy server are encoded for being interpreted at the proxy server and then discarded without being forwarded to the Internet.

5. The method of claim 3, wherein the personalized information is information required for accessing a website via the Internet.

6. The method of claim 3, wherein the personalized information in the second HTTP request is extracted by the proxy server, and the proxy server uses such personalized information to obtain the results information via the Internet.

7. The method of claim 6, wherein the personalized information extracted from the second HTTP request is stored in a database for subsequent use by the proxy server in response to subsequent HTTP requests originating from the same user.

8. The method of claim 6, wherein the results information obtained via the Internet is information at a website, wherein the website facilitates transactions concerning personal accounts, and wherein the personalized information is required for accessing personal account information of the user at such website.

9. The method of claim 8, wherein the website facilitates transactions concerning financial accounts.

10. The method of claim 8, wherein website facilitates retail transactions by the user, and wherein the personalized information is required for conducting a retail transaction at such website.

11. The method of claim 6, wherein the personalized information comprises a user name and password.

12. The method of claim 6, wherein the personalized information comprises a cookie previously stored at a user machine associated with the web browser.

13. The method of claim 6, wherein the result information includes a cookie to be stored at a user machine associated with the web browser.

14. A computer implemented method for a user to access a website through a proxy impersonating the user, comprising:

encoding and sending an Internet Protocol (IP) message from the user to the proxy; receiving the IP message at the proxy;

decoding and parsing the IP message at the proxy, extracting a script identifier from the IP message, and thereafter searching a database for the script associated with the script identifier;

executing, at the proxy, the script associated with the script identifier;

generating, at the proxy, a result from the script associated with a script identifier;

discarding the IP message without forwarding the IP message to the Internet; and sending the result from the proxy to the user.

15. The method of claim 14, wherein the IP message is a first HTTP message.

16. The method of claim 15, wherein in response to executing the script, a second HTTP message is sent from the proxy to the user requesting a username and a password, the second HTTP message resulting in a prompt at the user for entering a username and password.

17. The method of claim 16, further comprising sending a third HTTP message with the username and password from the user to the proxy;

extracting the username and password from the third HTTP message at the proxy, and discarding the third HTTP message; and further executing the script associated with the script identifier using the username and password extracted from the third HTTP message.

18. The method of claim 15, wherein in response to executing the script, a second HTTP message is sent from the proxy server to the user pointing to the website and resulting in a third HTTP message being sent to the proxy and intended by the user for the website, the user providing a cookie associated with the website and accompanying the third HTTP message.

19. The method of claim 18, wherein the proxy extracts the cookie from the third HTTP message, discards that message, and uses the cookie in further execution of the script.

20. In a network having a plurality of users with web browsers and connected for accessing websites via the Internet, a database, and a proxy for impersonating a user, the proxy comprising:

a server for executing scripts that are stored in the database and that represent executable programming code, the server executing the scripts in order to request information from a specific user, to request information from a website to be accessed by the specific user, and to use the requested information to generate results for the specific user, wherein the server is disposed between the web browsers and the websites for interrogation of communication there between;

wherein the server receives an encoded HTTP message from the web browser of the specific user when access to the website is requested, such message including a script identifier for a script to be executed by the server in order to access the website;

wherein the server decodes and extracts the script identifier from the HTTP message, discards the message without forwarding the message to the Internet, and executes the identified script; and wherein in response to execution of the identified script the server requests information from at least one of the specific user and the website, uses such information in further executing the identified script, and provides a result to the specific user.

21. The proxy of claim 20, wherein in response to execution of the script the server sends a second HTTP message to the web browser of the specific user requesting personalized information of that user, and wherein in response to the second HTTP message the web browser sends a third HTTP message to the server having such personalized information, the third HTTP message being discarded by the server after such personalized information is extracted by the server.

22. The proxy of claim 21, wherein the personalized information is a user name and password.

23. The proxy of claim 21, wherein the personalized information is a cookie previously stored at the user by the website.

24. In a network having a plurality of users with web browsers and connected for accessing websites via the Internet, a data storage means, and a proxy for impersonating a user, the proxy comprising:

server means for executing scripts stored in the data base means in order to request information from a specific user, wherein the server means is disposed between the web browsers and the websites for interrogation of communication there between;

request information from a website to be accessed by the specific user, and use the requested information to generate results for the specific user; wherein the server means receives an encoded HTTP message from the specific user when access to the website is requested, such message including a script identifier for a script to be executed by the server means in order to access the website;

wherein in response to receiving the HTTP message the server means decodes and extracts the script identifier from the HTTP message, discards the message without forwarding the message to the Internet, and executes the identified script; and wherein in response to execution of the identified script the server means requests information from at least one of the specific user and the website, uses such information in further executing the identified script, and provides a result to the user.

25. A network comprising:

a plurality of users, each user having a web browser for accessing websites via the Internet; and a proxy for impersonating specific users and for connecting those users to the Internet wherein the proxy is disposed between the web browsers of the plurality of users and the Internet such that communication between the web browsers and the Internet flows through the proxy;

wherein the proxy server receives an encoded HTTP request from a user having personal information relating to the user, such personal information also relating to a specific website; and wherein the proxy decodes and extracts the personal information from the HTTP request and uses the extracted personal information to obtain results for the user and further wherein the proxy server discards the HTTP request without sending the HTTP request to the Internet.

26. The network of claim 25, wherein the proxy also receives information from the specific website and uses both the personal information and the website information to obtain results for the user.

27. The network of claim 25 wherein the proxy stores the personal information in a data storage device.

28. The network of claim 27 wherein in subsequent HTTP requests to the website that do not contain personal information, the proxy uses the stored personal information to obtain results for the user.

29. The network of claim 27 where the personal information is a user name and password.

30. The network of claim 27 where the personal information is a cookie.

31. The network of claim 25, wherein the HTTP request from the user is sent in response to an HTTP redirect massage from the proxy, the HTTP redirect message pointing to the specific website.

32. In a network having a plurality of users connected for accessing websites via the Internet, a database, and a proxy for impersonating a user, the proxy comprising:
- a server configured to intercept encoded HTTP messages between a specific user and the websites;
- wherein the server receives an encoded HTTP message from a specific user, such message including personalized information for the specific user;
- wherein the server decodes and extracts the personalized information from the HTTP message, and uses such personalized information to provide a result to the user and further wherein the server is to discard the HTTP messaqe without forwarding the HTTP message to the Internet; and
- wherein the personalized information extracted by the server is stored in the database, so that when the server subsequently receives an HTTP message from the user, the stored personalized information can be used by the server without requesting such information from the user.

* * * * *